Patented Feb. 12, 1929.

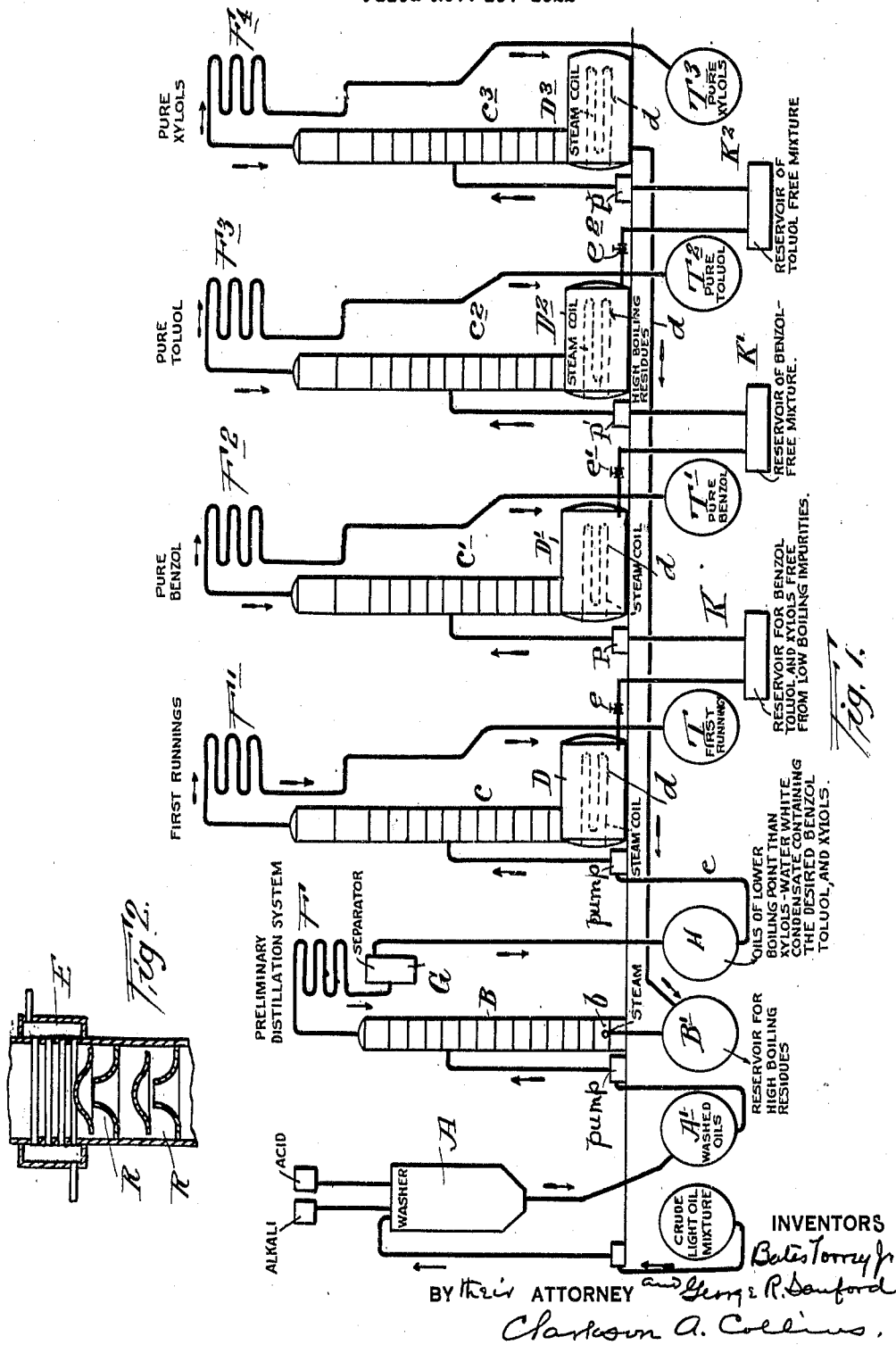

1,701,988

UNITED STATES PATENT OFFICE.

BATES TORREY, JR., AND GEORGE R. SANFORD, OF SYRACUSE, NEW YORK, ASSIGNORS TO SEMET-SOLVAY COMPANY, OF SOLVAY, NEW YORK, A CORPORATION OF NEW YORK.

ART OF SEPARATING LIQUIDS HAVING DIFFERENT BOILING POINTS.

Application filed November 13, 1922. Serial No. 600,636.

Our invention relates particularly to the separation of the volatile light oils, which are recovered as by-products from the gas given off in the destructive distillation of coal.

These oils, the principal of which are benzol, having a boiling point of 80.5° C., toluol having a boiling point of 110.3° C. and the xylols, the boiling points of which range from approximately 138° C. to 142° C. as recovered from the gas are mixed together and associated with a small proportion of still more volatile constituents, known as "first runnings", and also usually with other constituents of higher boiling points, and their usefulness and commercial value depend on their separation so that each may be recovered in a pure state uncontaminated with other ingredients.

Heretofore such separation, or fractionation of the oils and their recovery in a pure state has been effected by treating the mixture by a so-called intermittent or batch method so as to successively recover the components, of successively higher boiling points.

Attempts have also been made to effect such separation and recovery by a continuous process in which the mixed liquids, being admitted at one of a series of stills, are passed along from still to still through the series with continuous separation and removal of the components of successively higher boiling points.

So far as we are aware, however, no such process has proven successful in giving pure products directly, each of the distillates being associated with more or less of another, as an impurity, and requiring a supplementary distillation of the intermittent or batch type to effect its complete purification.

In any case, therefore, the recovery of the constituent light oils in a pure state from the crude light oil mixture has heretofore involved intermittent, or batch, fractionation steps with all the economic and operating disadvantages incident thereto.

Our invention solves the problem of recovering pure products from crude light oils directly and continuously, thereby obviating the difficulties heretofore met with, and providing a process having the recognized advantages and efficiency of a continuous operation, by which the desired components of successively higher boiling points are successively and separately recovered in a pure state and in a continuous manner.

To effect this, the crude light oil mixture is first subjected to an acid wash purification. This removes such impurities as unsaturated hydrocarbons. The washed crude oil is then subjected to distillation, preferably continuously and with direct steam, so that the non-volatile and high boiling impurities such as sulfate and resins from the acid washing, naphthalene, etc. remaining behind and a distillate is obtained which is water white, substantially free from high boiling impurities and consists essentially of a mixture of the desired products and of them only.

The distillate is then continuously passed through a series of dephlegmating columns in each of which the component of lowest boiling point in that column and it only is completely distilled off by the action of hot vapors of the other components and the residue, now free from the lowest boiling component is conducted to the next succeeding column wherein the component of next higher boiling point is similarly eliminated and recovered.

In order to prevent the possible contamination of the product from a column with traces of the product of next lower boiling point due to accidental or incidental incomplete prior removal of that product, the residue from each column is conducted, not directly into the succeeding column, but into a reservoir interposed between the two columns and from this into the succeeding column. In case of the incomplete elimination from any column of the component of lowest boiling point, the flow of residue to such reservoir is cut off until complete elimination of such component is re-established. Thus each column is fed from a pool or reservoir of mixed oils which is at all times free from any trace of that component being distilled off from the preceding column, and possible contamination therewith is avoided.

The invention will be best understood by reference to the accompanying drawings, Fig. 1 of which is a diagrammatic representation of a system of apparatus which may be used in carrying the process into effect and Fig. 2 is a vertical sectional view of a portion of one of the dephlegmating columns showing details of construction on an enlarged scale.

Referring to the drawings, A, indicates any well known form of apparatus for washing the crude mixed oils with acid and an alkali to remove the unsaturated hydrocarbons. B, is a column in which the desired oils are distilled off together from the washed product by steam admitted directly thereto. C, C$^1$, C$^2$, C$^3$, indicate a series of dephlegmating columns respectively connected with stills, D, D$^1$, D$^2$, D$^3$, which are provided with heating means as steam coils $d$. The columns, C, etc. are formed in the usual manner of rings or pans, R, R, and each is provided in its upper portions with cooling means as tubes, or coils, E, E. The columns are of such height, which can be readily determined by experiment under any given condition, as to expose a stream of the mixed oils flowing downward therethrough to hot vapors rising from the still for a sufficient time to effect the complete volatilization of its component of lowest boiling point, as is more fully hereinafter explained.

In carrying the process into effect the stills D, D$^1$, D$^2$, D$^3$, are each charged with the mixture to be fractionated with the exception of that component which is to be recovered from the column connected with such still, or with any lesser number of the components having higher boiling points. Thus, assuming that the "first runnings" are to be distilled off from the column C, the still, D, may contain a mixture of benzol, toluol, xylol and the less volatile residue. The still, D$^1$, will contain these with the exception of benzol and so on through the series.

The mixed oils as recovered from the gas are washed in the washer, A, first with sulfuric acid to remove the unsaturated hydrocarbons and then with an alkali, as caustic soda, to remove adhering acid, and the washed oils are discharged into a receiving tank, A$^1$. From the tank, A$^1$, the oils are pumped into a distilling column, B, of any usual construction in which they are subjected to the direct action of steam, admitted to the bottom of the column, as at, $b$.

By this the oils are vaporized and separated from certain impurities of high boiling point, such as resinous materials, naphthalene and sodium sulfate. The vaporized oils are condensed in cooling coils, F, and after being separated from the water of condensation in a settling tank, G, are drawn off to a storage tank, H. The unvaporized residue is drawn off from the bottom of the column to storage tank, B$^1$.

In this manner a water-white distillate of the desired volatile oils is obtained the advantages of which in the subsequent operations will be readily understood.

From the tank, H, the mixed oils are continuously admitted, as by being pumped through pipe, $c$, to column, C, and flow downward from pan to pan through the column. At the same time vapors from the heated mixture of liquids in the still, D, are rising through the column and meet the downflowing stream of liquid, vaporizing the component of lowest boiling point, in this case the "first runnings" and also some portion of the other components. The vapors pass up to the top of the column where such a temperature is maintained by the cooling coils, E, that a portion of the vapors of the component of lowest boiling point of the inflowing stream is condensed and remains as condensate in the upper pan, or pans, of the column while another portion, which as the operation progresses will equal in quantity that entering the column, C, in liquid form, continuously passes out of the column as vapor and is condensed and drawn off to storage.

In practice because of the extremely volatile and inflammable character of the "first runnings" some benzol is allowed to pass off with these. The remainder of the benzol vapors and all of the vapors of the other components of higher boiling points are condensed and the condensate flows downward through the column, C, to the still, D.

The point of admission of the liquid to the column, C, is so located as to insure as far as possible the complete vaporization of the component, of lowest boiling point from the downflowing liquid stream and preferably so that the composition of the liquid corresponds with that in the column at that point. Under certain conditions, however, as of sudden change in the rate of flow of liquid or in the heat applied to the still some of the component of lowest boiling point may temporarily descend into the still. In order to prevent this from becoming mixed with the product of the succeeding still a reservoir, K, is interposed between column, C, and the column C$^1$, which receives the liquid from the still, D.

When the liquid flowing into the still D, from the column, is completely free of the component of lowest boiling point, the liquid from the still, D, passes freely into the reservoir, K, and is delivered by pump P, to the column, C$^1$. If however, it appears at any time, as can be ascertained by tests well understood by those skilled in the art, that complete volatilization of the component of lowest boiling point is not being effected, but that some of this is finding its way back to the still in liquid form with the other components, then the flow of liquid from still, D, to reservoir, K, is temporarily shut off as by closing valve, $e$, and the column, C$^1$, continues to be continuously fed from the accumulation of liquid in reservoir, K, until complete vaporization of the component of lowest boiling point in column, C, has been resumed and the liquid in still, D, is free therefrom.

Thus a pool of liquid free from "first runnings" is maintained and continuously fed to column, C¹, from which the component next in boiling point, benzol, is similarly driven off in a pure state. In the same manner, a supply of a mixture free from benzol is maintained in reservoir, K¹, and continuously fed to column, C², from which the toluol is driven off in a pure state and in reservoir K², a mixture free from toluol, which is continuously fed to the final column, C³, in which the xylols are vaporized and driven off. If desired, on account of the small proportion of xylols present in the mixed oils, or for other reason, the column for the recovery of the xylols may be omitted and the continuous operation stop with the recovery of the toluol. The vapor products from the several columns are respectively condensed by being passed through cooling coils F¹, F², F³, F⁴, and are conducted to storage tanks T, T¹, T², T³. The unvaporized high boiling residue in still, D³, is drawn off to a storage tank as B¹.

While the above is our preferred method of operation it will be evident that the "first runnings" may also be removed by fractional condensation of the vapors from column, B, so as to give two fractions—the first a water white distillate containing the desired volatile oils, and the second the "first runnings". In this case the first runnings still, D, and column, C, are omitted and the water white distillate, now already free from first runnings goes directly to the benzol column, C¹.

By the means hereinbefore described, we are able in a single continuous operation to separate the light oils and to recover each in a pure state whereby the necessity of redistillation to effect purification is avoided, the advantages of which will be well understood by those skilled in the art.

It will be understood that whenever in this specification or in the claims reference is made to a "pure state" of a product or to the fact that a product is "free from" or "completely free of" other components or that there is "complete removal" of one component or that a product contains "only" one component, such expressions and others of similar character refer to a condition of purity such as is represented in this art by a product which is acceptable to the trade. Thus, for example, the benzol product of this application as shipped from the factory in tank cars will obviously not necessarily be chemically pure in the sense of a laboratory reagent sold and used in quantities of the order of a few cubic centimeters or ounces although it will be pure benzol in the commercial sense for industrial or large scale manufacturing operations.

Having thus described our invention what we claim as new and desire to secure by Letters Patent is:—

1. A process of continuously and successively recovering components in commercially pure state from a liquid mixture of said components in which the vapor pressure of all mixtures of said components lies between the vapor pressures of the components, which comprises introducing a liquid mixture inclusive of at least one higher boiling substance than the highest boiling component to be removed in commercially pure state but free from substances having a lower boiling point than the lowest boiling component to be removed in commercially pure state, into an intermediate point of a dephlegmator so as to subject the liquid, as a downwardly flowing stream to the action of the vapors of its higher boiling components; controlling the temperature in the dephlegmator so that the lowest boiling component only and all of the lowest boiling component of the mixture passes from the dephlegmator as a vapor; continuously condensing the said vapor of the lowest boiling component in commercially pure state; continuously withdrawing liquid residue of the first step as it runs free from the lowest boiling component and collecting the withdrawn liquid residue in a pool to establish a reservoir of sufficient volume of the accumulated liquid residue as to be capable of continuously supplying a second dephlegmator, notwithstanding temporary discontinuance of flow of liquid residue into said pool; temporarily discontinuing the aforesaid withdrawal of liquid residue whenever the latter gives indications of contamination with the lowest boiling component and, in conjunction with said step, re-effecting, by thermal adjustment, the initially established complete removal of said lowest boiling component and thereafter continuing the collection of liquid residue in the said pool; continuously feeding the liquid from the reservoir to an intermediate point in a second dephlegmator; therein repeating the operations hereinabove set forth with reference to the first dephlegmator but with temperature regulation appropriate for the distillation and removal of the whole of the next lowest boiling component; and thereafter repeating the procedure heretofore set forth until all the desired components have been successively isolated in commercially pure state.

2. A process of continuously and successively recovering benzol and toluol, each in commercially pure state, which comprises introducing a mixture of benzol and toluol inclusive of at least one higher boiling substance than toluol, but free from substances having a lower boiling point than benzol, into an intermediate point of a dephlegmator so as to subject the liquid as a downwardly flowing stream to the action of the vapors of its higher boiling constituents, regulating the temperature in the dephlegmator so that benzol only and all of the benzol of the mixture passes from the dephlegmator as a vapor, continuously condensing the said vapor of commercially pure benzol; continuously withdrawing liquid residue of the first step as it runs free from the lowest boiling component and collecting the withdrawn liquid residue in a pool to establish a reservoir of sufficient volume of the accumulated liquid residue as to be capable of continuously supplying a second dephlegmator, notwithstanding temporary discontinuance of flow of liquid residue into said pool; temporarily discontinuing the aforesaid withdrawal of liquid residue whenever the latter gives indications of contamination with the lowest boiling component and, in conjunction with said step, re-effecting, by thermal adjustment, the initially established complete removal of said lowest boiling component and thereafter continuing the collection of liquid residue in the said pool; continuously feeding the liquid from the reservoir to an intermediate point in a second dephlegmator, and therein repeating the operations hereinabove set forth with reference to the benzol dephlegmator but with temperature regulation appropriate for the distillation and removal of the whole of toluol as commercially pure toluol.

3. The process described in claim 2 in which the initial mixture contains benzol, toluol, and at least one higher boiling substance than xylols but is free from substances having a lower boiling point than benzol and in which process the liquid residues from the toluol dephlegmator containing xylols and at least one higher boiling substance are controlled and withdrawn to a second reservoir of the safe kind and in the same manner as set forth with respect to the benzol reservoir but modified for the toluol conditions, and from said second reservoir continuously feeding liquid free from benzol and toluol to an intermediate point in a third dephlegmator; and therein by temperature regulation appropriate for the distillation and removal of the whole of xylols, recovering the same as commercially pure xylols.

4. The process of recovering continuously commercially pure products from crude light oils which comprises washing crude light oils with acid, heating the washed oils so as to vaporize the desired end products as a mixture; condensing the mixed vapors, heating the condensate so as to completely remove all components with boiling points lower than that of benzol and thereafter proceeding in the manner set forth in claim 2.

5. The process of recovering continuously commercially pure products from crude light oils which comprises washing crude light oils with acid, heating the washed oils with direct steam so as to vaporize the desired end products as a mixture; condensing the mixed vapors, heating the condensate so as to completely remove all components with boiling points lower than that of benzol and thereafter proceeding in the manner set forth in claim 2.

6. The process of recovering continuously commercially pure products from crude light oils, which comprises continuously subjecting said light oils to distillation so as to vaporize as a mixture all of the desired end products which were contained in said crude light oils, the distillate including a fraction having a lower boiling point than benzol, condensing the said mixed vapors to a water-white condensate, distilling the condensate so as to completely remove all components with boiling points lower than that of benzol and thereafter proceeding in the manner set forth in claim 2.

In testimony whereof we affix our signatures, this 8th day of November, 1922.

BATES TORREY, Jr.
GEORGE R. SANFORD.